Nov. 11, 1952  H. G. NUTTER  2,617,972
AUTOMATIC RAIN-RESPONSIVE TOP AND WINDOW LIFTING SYSTEM
Filed Sept. 28, 1949
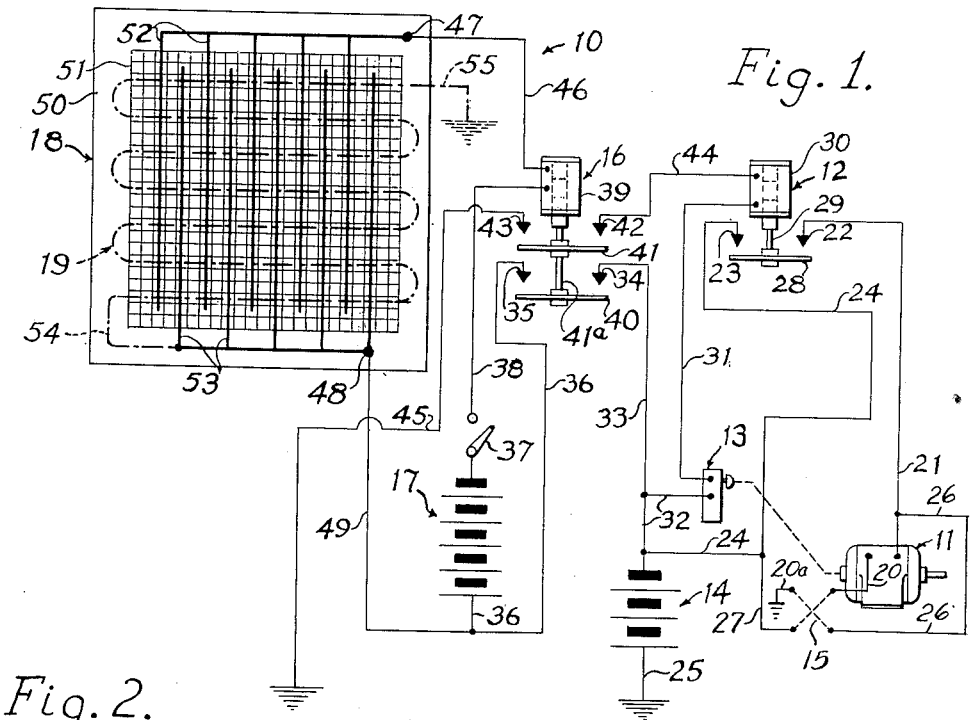
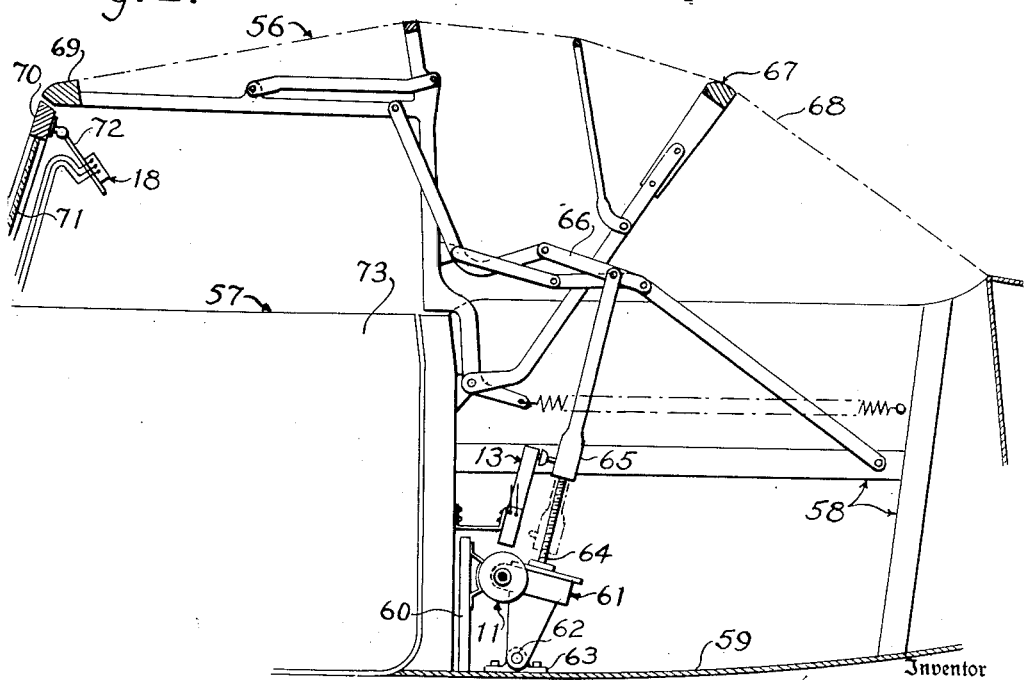
Inventor
Hugh G. Nutter
Barthel & Bugbee
Attorneys Patented Nov. 11, 1952

2,617,972

UNITED STATES PATENT OFFICE 2,617,972

AUTOMATIC RAIN-RESPONSIVE TOP AND WINDOW LIFTING SYSTEM

Hugh G. Nutter, Grosse Pointe Farms, Mich.

Application September 28, 1949, Serial No. 118,442

6 Claims. (Cl. 318—483)

This invention relates to vehicle top and window lifting devices, and in particular, to automatic circuits for raising such tops or windows.

Heretofore, one of the objections to the use of so-called convertible automobiles has arisen from the fact that a sudden rain or snow-storm will thoroughly drench the interior of the automobile while the owner is absent and while the top is down. A somewhat lesser disadvantage of permanent top vehicles arises from the same cause when their windows are left open. Thus, the owner often returns to such an automobile to find it so wet as to be driven only with extreme discomfort.

The present invention solves this prior problem by providing an electrical system which will automatically cause the top to be raised and optionally also the windows of an automobile upon the occurrence of rainfall, without the need for any action on the part of the operator or even for his presence. The invention includes a moisture-responsive circuit connecting device connected in series with the energization circuit of the electric top-raising or window-raising motor, or in series with the energization circuit of a sensitive relay which in turn closes the energization circuit of the above-mentioned electric motor.

This circuit connecting device consists of a sheet-like member containing interlaced but separated conductors located in a material, such as a fabric, which is impregnated with a salt. This salt, in the presence of water arising from the downfall of rain or snow, forms an electrolyte. As the electrolyte is a sufficiently good conductor of electricity to electrically connect these conductors, it closes the circuit to the sensitive relay, which in turn closes the energization circuit of the electric top-raising or window-raising motor. The device is in such a location, such as immediately behind the top of the windshield, that it will be covered by the forward edge of the top when the top is raised, thereby preventing further rain or snow from reaching it. The device finally includes an electrical heater, the circuit of which is also closed along with the motor energization circuit, this heater being operative to evaporate the rain which has fallen upon the device, thereby causing it to dry out and cease to carry current, thus de-energizing the circuit.

One object of this invention is therefore to provide an electric top-raising or window-raising system for vehicles wherein the downfall of rain or snow or other heavy moisture will quickly energize the top-raising or window-raising motor and cause it to lift the top or windows into the raised position thereof, so as to prevent further damage by the rain, snow or other moisture.

Another object is to provide a top-raising or window-raising system of the foregoing character, wherein the raising motor energization circuit is opened and closed by a sensitive relay which in turn is under the control of a moisture-responsive circuit closing device which operates automatically to close these circuits in response to the heavy fall of moisture from rain, snow or the like.

Another object is to provide a top-raising system of the foregoing character wherein the circuit-closing device is provided with a heater which dries out the device and renders it inactive until the next downfall of moisture.

In the drawings:

Figure 1 is a diagrammatic view of a top-raising or window-raising system operated automatically by the downfall of rain or other heavy moisture, according to one form of the present invention; and Figure 2 is a diagrammatic central vertical longitudinal section through the body of a convertible automobile showing one form of installation of the system set forth in Figure 1.

Referring to the drawings in general, Figure 1 shows the top or window-raising system of the present invention, generally designated 10, as consisting generally of a reversible top or window-raising motor 11, an electro-magnetic motor energization switch 12, a normally-closed limit switch 13 for halting the motor 11 when the top has reached its raised position, a main vehicle battery 14, and a manual reversing switch 15 for manually controlling the raising or lowering of the top or window. The system 10 also contains a sensitive relay, generally designated 16, energized from an auxiliary or control battery 17, and a moisture-responsive circuit closing device 18 operative to energize the relay 16 and consequently to energize the motor 11 by closing the energization circuit of the electro-magnetic switch 12 when rain or other moisture falls upon the circuit closing device 18. The latter also contains a heater 19 for drying it out and restoring it to its inactive but ready condition after the top or windows have been raised and the vehicle has been thereby protected.

Referring to the drawings in detail, the top or window-raising motor 11 is grounded by the lines 20 and 20a running by way of the reversing switch 15 to the frame or other portion of the vehicle. From the opposite pole of the motor 11 a line 21 runs to the contact 22 of the electro-magnetic switch 12, from the opposite contact 23 of which the line 24 runs to one pole of the main vehicle battery 14, the other pole being grounded by the line 25. Bridging lines 26 and 27 extend from the lines 21 and 24 respectively to the manual reversing switch 15 and cooperate with the ground lines 20 and 20a to by-pass the electro-magnetic switch 12 and permit the top or windows to be operated manually by the vehicle operator. As previously stated, the motor 11 is a reversible motor and the switch 15 a double throw reversing switch whereby the motor 11 may be rotated in opposite directions to lower the top as well as to raise it.

The contacts 22 and 23 of the electro-magnetic switch 12 are adapted to be bridged by a switch blade 28 attached to the armature 29 of a solenoid 30. Extending from one pole of the solenoid 30 is a conductor 31 which leads to the limit switch 13 from the opposite pole of which the line 32 runs to the ungrounded pole of the main vehicle battery 14, the opposite pole of which is grounded, as has been previously stated above. From the line 32, an auxiliary line 33 leads to the lower right-hand contact 34 of the sensitive relay 16, from the opposite pole 35 of which a line 36 runs downward to one pole of the auxiliary battery 17. The main car battery 14 is of the usual voltage and ampere hour characteristics, whereas the auxiliary battery or control battery 17 is preferably of higher voltage in order to make the sensitive relay 16 operate more rapidly and render the circuit closing device 18 more sensitive to moisture as a result.

The manual switch 37 controls the energization of the auxiliary or control battery 17 by opening and closing the circuit between the lines 38 and 36, the line 38 running to one pole of the operating coil 39 of the sensitive relay 16. The contacts 34 and 35 are closed by the lower switch blade 40 of the sensitive relay 16 which, with the upper switch blade 41 is mounted on the armature 41a thereof. The switch blade 41 interconnects the upper contacts 42 and 43, and thereby connects the line 44 running from the contact 42 to the electro-magnetic switch coil 30 with the ground line 45 running to the ground. From the remaining pole of the operating coil 39 of the sensitive relay 16, the line 46 runs to one pole 47 of the circuit closing device 18, from the opposite pole 48 of which the line 49 runs to a junction with the line 36 at one end of the auxiliary or control battery 17.

The circuit closing device 18 which is responsive to the downfall of rain or other heavy moisture to close the energization circuit of the sensitive relay 16 and therefore to energize the top or window raising motor 11, consists of a base 50 having a supporting sheet 51 of fabric or other suitable material. Interlaced through the supporting sheet 51 are spaced but closely adjacent conductors 52 and 53, such as in a pattern resembling a gridiron or, more closely, the conventional diagrammatic representation of an electrical condenser in an electrical circuit. Also connected to the pole 48 so as to be energized from the line 49 is a zigzag heating coil 54, the opposite end of which is grounded by the line 55. The upper surface of the sheet 51 is impregnated with a water-soluble salt of an electrolyte (not shown), such as sodium chloride or other suitable chemical which is electrically conducting when wet and electrically insulating when dry.

Figure 2 shows the system of Figure 1 applied to the automatic raising of a top, generally designated 56, of a convertible motor vehicle body 57. The body 57, of which Figure 2 is a view in longitudinal section from the inside looking toward the outside, is provided with the usual frame 58 and floor 59 from which rises a vertical bracket 60 carrying the motor 11. The latter is connected by a flexible shaft or by a shaft with a universal joint (not shown) to a top-raising operator 61 tiltably mounted as at 62 upon the bracket 63 bolted to the floor 59. The operator 61 contains reduction gearing, such as a worm and worm wheel, connected to a screw shaft 64 which in turn threadedly engages an internally threaded hollow reciprocable plunger 65, the upper end of which is pivotally connected to the intermediate portion of the link 66 forming a part of the top frame, generally designated 67. The operator 61 and the top frame 67 are conventional and their details are beyond the scope of the present invention. Any suitable conventional top frame 57 may be employed, the one shown in Figure 2 being described and illustrated in the Westrope Patent 2,264,602 of December 2, 1941. For the purposes of the present description, it is sufficient to say that as the hollow threaded plunger 65 moves upward, it raises the frame 67 of the top 56, this being covered with the usual fabric 68 and having a forward bow 69 which engages the top bar 70 of the windshield 71. Conversely, when the motor 11 is rotated in the reverse direction, the plunger 65 descends, pulling the forward top bow 69 downwardly and rearwardly and folding the top frame 67 in its lowered position.

Secured to the top bar 70 of the windshield 71 is a support 72 for the circuit closing device 18. The support 72, for convenience, may be an inside visor for cutting down glare. The device 18 is so mounted that its upper surface will receive rain when the top 56 is lowered, but will be protected from rain when the top 56 is raised.

In the operation of the invention, let it be assumed that the top 56 has been lowered, such as by the operator actuating the reversing switch 15, and that the top frame 67 has accordingly been swung downwardly and rearwardly until it rests adjacent the rearward portion of the body 57. The passenger compartment 73 is therefore open to the sky. If, now, the operator should leave the car and a rain storm should occur in his absence, the first few drops of rain impinging upon the upper surface of the fabric sheet 51 will wet it and at the same time cause the electrolyte (not shown) to increase the electrical conductivity so as to establish a current path between the conductors 52 and 53. This causes current to flow from the auxiliary or control battery 17 through the operating coil 39 of the sensitive relay 16 by way of the conductors 52 and 53 and their connecting conductors 49, 38 and 46.

The energization of the relay 16 closes its switch blades 40 and 41 upon its lower and upper contacts 34, 35 and 42, 43. The closing of the upper contacts 42, 43 immediately energizes the operating coil 30 of the electro-magnetic switch 12, by connecting its opposite poles to the ground through the lines 44 and 45 and the upper switch blade 41, and through the lines 31 and 32 and the limit switch 13 to the grounded battery 14. The consequent flow of current from the battery 14 through the motor 11 by way of the line 24, the contacts 23 and 22, the switch blade 28, the line 21, and the line 20 to the ground energizes the motor 11 and starts it. This causes the top operator 61 to be set in motion, moving the hollow plunger 65 upward to raise the top 56 to its fully extended position. The limit switch 13 opens, deenergizing the operating coil 30 of the electro-magnetic switch 12, consequently halting the motor 11. Meanwhile, the closing of the lower switch blade 40 of the sensitive relay 16 connects the heater 19 to the battery 14 by way of the line 33, the contacts 34 and 35, the switch blade 40, the line 36, the line 49, the pole 48, the heating coil 54 and thence to the ground through the line 55, completing the circuit.

As the forward bow 69 of the top 56 reaches the windshield cross bar 70, it covers the circuit closing device 18, which in the meantime is being heated by the heater 19. Thus, rain is prevented from falling on the device 18 and the heater 19 dries it out. When the moisture is driven out in this manner, the electrolyte again becomes a dry salt which is electrically non-conducting, opening the electrical circuit between the wire grids 52 and 53 and consequently de-energizing the relay operating coil 16. Henceforth, in order to lower the top, the operator must employ the reversing switch 15 in the usual manner, but the device 18 is again ready to go into action when the first drops of rain impinge upon it, so as to raise the top 56 and protect the interior of the vehicle and its contents.

The installation shown in Figure 2 illustrates the application of the system of this invention to a vehicle top which is raised and lowered by an electric motor directly coupled to the mechanical top-raising and lowering mechanism 61. The same system shown in Figure 1, however, is equally applicable to the so-called hydraulic or electro-hydraulic devices wherein a hydraulic motor consisting of a cylinder and piston is employed to raise and lower the top in place of the screw 64 and hollow nut 65. In such systems, the motor 11 of Figure 1 is coupled to the pump which supplies the pressure fluid for operating the hydraulic motor, and a spring is preferably used to urge the control valve member normally into its top-raising position. Since, however, the pump driving motor 11 is not energized until the switch blade 28 is closed across the contacts 22 and 23 by the closing of the sensitive relay 16, the hydraulic motor will not operate until the electric motor 11 starts to drive the pump so as to generate pressure fluid. The action is otherwise substantially the same as in the case of the all-mechanical arrangement shown in Figure 2.

The invention has been described and illustrated principally in connection with the raising of the top of a convertible automobile. Automobiles which have permanent tops, however, often suffer damage from rain when their windows remain lowered while the owner is absent from the vehicle. Many modern vehicles, however, are now equipped with motor-driven window-raising mechanisms. The present invention is equally useful for automatically raising the windows of such a vehicle immediately upon the start of a rainstorm. Under such circumstances, the same system is employed as is shown in Figure 1, with the exception of the fact that the motor 11 now becomes the window-raising motor, and the circuit closing device 18 is placed in a position, such as on the window ledge, where it will receive rain when the window is open but will be shielded from it when the window is closed. The operation is otherwise so closely the same as to require no duplication of description. When the rain descends upon the circuit closer 18, the sensitive relay 16 is energized in the manner previously described, by wetting of the fabric 51 with its electrolyte impregnation and its grid work of conductors 52 and 53. The consequent closing of the electromagnetic switch 12 energizes the window-raising motor 11 while the closing of the relay 16 starts the heater 19 in operation. In either case, when the top or the window reaches its closed position, the limit switch 13 opens and halts the motor.

In place of the limit switch 13 for each window, a single time switch may be substituted for controlling the motors of all four windows, this switch closing the circuit long enough to allow all four windows to close, and then opening automatically. Such a time switch, for example, may consist of a bimetal thermostatic element having a heating coil around it which, after a predetermined length of time heats the bimetal sufficiently to cause its differently expansive metal components to swing it arcuately in a manner well-known in connection with such bimetal elements, thereby separating the switch contacts and opening the circuit. This use of a single time-responsive switch simplifies the circuit and insures that all motors will have had time to close all of the windows without the necessity of providing four limit switches with their accompanying wiring.

What I claim is:

1. An automatic moisture-responsive system for operating the raising mechanism of a vehicle top or window structure, said system comprising an electric motor drivingly connected to said mechanism, an energization circuit electrically connected to said motor, a normally non-conducting circuit-closing device including a plurality of spaced conductors in said circuit and a substance which is non-conducting when dry but conducting when wet disposed between said conductors, said device being responsive to the reception of moisture to become electrically conducting and to energize said motor, and a dehydrator associated with said circuit-closing device and arranged to dehydrate said substance to render the same non-conducting.

2. An automatic moisture-responsive system for operating the raising mechanism of a vehicle top or window structure, said system comprising an electric motor drivingly connected to said mechanism, an energization circuit electrically connected to said motor, a normally non-conducting circuit-closing device including a plurality of spaced conductors in said circuit and a substance which is non-conducting when dry but conducting when wet disposed between said conductors, said device being responsive to the reception of moisture to become electrically conducting and to energize said motor, and a heater associated with said circuit-closing device and arranged to dry out said substance to render the same non-conducting after the closing of said structure.

3. An automatic moisture-responsive system for operating the raising mechanism of a vehicle top or window structure, said system comprising an electric motor drivingly connected to said mechanism, a motor energization circuit electrically connected to said motor and containing an electro-magnetic switch, a control circuit containing a relay having its circuit breaker connected to control the energization of said switch, a main source of electricity connected to said motor energization circuit, an auxiliary source of electricity connected to said control circuit, and a normally non-conducting circuit-closing device in said control circuit including a plurality of spaced conductors in said circuit and a substance which is non-conducting when dry but conducting when wet disposed between said conductors, said device being responsive to the reception of moisture to become electrically conducting to energize said control circuit whereby to close said relay and energize said motor energization circuit.

4. An automatic moisture-responsive system for operating the raising mechanism of a vehicle top or window structure, said system comprising an electric motor drivingly connected to said mechanism, a motor energization circuit electrically connected to said motor and containing an electro-magnetic switch, a control circuit containing a relay having its circuit breaker connected to control the energization of said switch, a main source of electricity connected to said motor energization circuit, an auxiliary source of electricity connected to said control circuit, a normally non-conducting circuit closing device in said control circuit including a plurality of spaced conductors in said circuit and a substance which is non-conducting when dry but conducting when wet disposed between said conductors, said device being responsive to the reception of moisture to become electrically conducting to energize said control circuit whereby to close said relay and energize said motor energization circuit, and a dehydrator associated with said circuit closing device and arranged to dehydrate said substance to render the same non-conducting.

5. An automatic moisture-responsive system for operating the raising mechanism of a vehicle top or window structure, said system comprising an electric motor drivingly connected to said mechanism, a motor energization circuit electrically connected to said motor and containing an electro-magnetic switch, a control circuit containing a relay having its circuit breaker connected to control the energization of said switch, a main source of electricity connected to said motor energization circuit, an auxiliary source of electricity connected to said control circuit, a normally non-conducting circuit-closing device in said control circuit including a plurality of spaced conductors in said circuit and a substance which is non-conducting when dry but conducting when wet disposed between said conductors, said device being responsive to the reception of moisture to become electrically conducting to energize said motor energization circuit, and a heater associated with said circuit-closing device and arranged to dry out said substance to render the same non-conducting after the closing of said structure.

6. An automatic moisture-responsive system for operating the raising mechanism of a vehicle top or window structure, said system comprising an electric motor drivingly connected to said mechanism, a motor energization circuit electrically connected to said motor and containing an electro-magnetic switch, a control circuit containing a relay having its circuit breaker connected to control the energization of said switch, a source of electricity connected to said motor energization circuit and to said control circuit, and a normally non-conducting circuit-closing device in said control circuit including a plurality of spaced conductors in said circuit and a substance which is non-conducting when dry but conducting when wet disposed between said conductors, said device being responsive to the reception of moisture to become electrically conducting to energize said control circuit whereby to close said relay and energize said motor energization circuit.

HUGH G. NUTTER.

REFERENCES CITED

The following references are of record in the file of this patent:

UNITED STATES PATENTS

| Number | Name | Date |
|---|---|---|
| 336,773 | Weil | Feb. 23, 1886 |
| 1,648,197 | Roodhouse | Nov. 8, 1927 |
| 1,772,232 | Van Guilder | Aug. 5, 1930 |
| 2,198,488 | Smith | Apr. 23, 1940 |
| 2,293,447 | Shibelli | Aug. 18, 1942 |
| 2,407,215 | Anderson | Sept. 10, 1946 |
| 2,424,735 | Boothroyd | July 29, 1947 |